United States Patent [19]
Mo et al.

[11] Patent Number: 6,061,824
[45] Date of Patent: May 9, 2000

[54] PIPELINED ERROR CORRECTION FOR MINIMIZING DISK RE-READING IN HARD DRIVES

[75] Inventors: Shih Mo, Milpitas; Stanley Chang, Pleasanton, both of Calif.

[73] Assignee: Quantum Corporation, Milpitas, Calif.

[21] Appl. No.: 09/035,675

[22] Filed: Mar. 5, 1998

[51] Int. Cl.$^7$ .......................... G11C 29/00; H03M 13/00
[52] U.S. Cl. ............................ 714/769; 714/761
[58] Field of Search .................... 714/763, 761, 714/762, 767–771, 758, 781–785

[56] References Cited

U.S. PATENT DOCUMENTS

| | | | |
|---|---|---|---|
| 4,782,490 | 11/1988 | Tenengolts | 714/756 |
| 4,916,702 | 4/1990 | Berlekamp | 714/762 |
| 5,058,116 | 10/1991 | Chao et al. | 714/764 |
| 5,220,569 | 6/1993 | Hartness | 714/758 |
| 5,333,143 | 7/1994 | Blaum et al. | 714/766 |
| 5,754,565 | 5/1998 | Mo et al. | 714/769 |

Primary Examiner—Emmanuel L. Moise
Attorney, Agent, or Firm—Wagner Murabito & Hao

[57] ABSTRACT

In a hard disk drive, a two-level pipelined method of processing data errors which minimizes disk re-reads. In the first level, a sector is read and a syndrome is generated based on the ECC bits appended for that sector. If there are no errors, the next sector is read. However, if an error is detected, a flag is checked. If the flag is currently set, the disk drive is prevented from reading the next sector. If the flag is not set, the disk drive is allowed to proceed with reading the next sector; the syndrome is stored in a register; and hardware error correction is performed. If the error is corrected by the hardware circuit, the process repeats by reading the next sector. But if the hardware circuit cannot correct the error, a second level firmware error correction is eventually initiated for handling the error. The flag is set in order to prevent a subsequent syndrome from overwriting the syndrome currently in the register. The flag is cleared only after the syndrome currently in the register has been read by the firmware. Once the flag is cleared, the disk drive may resume reading the next sector, etc.

15 Claims, 4 Drawing Sheets

PIPELINED ERROR CORRECTION FOR MINIMIZING DISK RE-READING IN HARD DRIVES

TECHNICAL FIELD

The present invention relates to the field of error correction in disk drive devices. More specifically, the present invention pertains to an apparatus and method for minimizing disk re-reading by using a pipelined error correction scheme.

BACKGROUND ART

Computer systems store data in a number of different storage systems. One common computer system storage system is that of hard disk drives. In a hard disk drive, the bits (i.e., "1's" and "0's") of digital data are stored magnetically onto one or more disks. A transducer is positioned by an actuator assembly over a spinning disk. Often, the same transducer is used to write the data onto the spinning disk as well as read data that had been previously stored. However, errors may occasionally occur due to any number of reasons (e.g., small portions of the disk media might become corrupted, electrical interference, electromechanical failures, etc.). Unless these errors are fixed, the data will become compromised. This may lead to serious consequences. For example, incorrect financial data can be disastrous. Furthermore, any errors in a computer program stored in a hard disk drive may cause the entire computer system to crash. It is virtually impossible to economically manufacture hard disk drives which are impervious to errors. Further exacerbating the seriousness of these errors is the trend to implement new magneto-resistive (MR) technology. In the near future, MR technology will allow disk drives to significantly increase their storage capacity versus the more traditional thin-film technology widely used today. However, MR technology is less reliable; errors are more frequent and likely to occur. Thus, there must be some mechanism for detecting and correcting any errors which might be encountered.

One way to correct for potential errors involves appending error correction code (ECC) bits at the end of each data segment. Before data is actually written to a disk, the disk drive calculates a unique ECC for each of the data segments. The data along with its unique set of ECC bits are written to the disk. Subsequently, when the data is later read back from the disk, the corresponding ECC bits are also read back. The disk drive checks the retrieved data against its corresponding ECC to determine whether there were any errors in the retrieved data. If there are no errors, the disk drive continues with its normal mode of operations. However, if an error is detected, the disk drive attempts to correct the error based on the ECC bits.

Although this prior art error correction mechanism functions properly, it is extremely slow. More particularly, if a second error is encountered while the error correction circuit is attempting to fix a prior error condition, the entire disk drive must shut down. There is typically no mechanism for handling two errors at the same time. The entire disk drive remains disabled until the first error is resolved. Thereupon, the sector containing the second error must then be re-read. This imposes another delay while the disk is spun to the corresponding location. Recurrent delays detrimentally impact the overall speed of the disk drive system. Moreover, some disk drive are highly sensitive to even modest amounts of disruption. For instance, audio/video (A/V) disk drives cannot tolerate much delay due to the real-time nature of audio and video. Audio as well as video data are magnetically stored within the hard disk drive as a continuous bit stream. This data is then subsequently read back from the disk drive for playback at the discretion of the user. Any significant interruption in the read-back of the data would result in perceptible audio glitches and visually disturbing video artifacts.

Thus, there is a need in the disk drive industry for a fast, economical, and effective error correction mechanism. The present invention offers a novel solution that employs a pipelined error correction approach. This pipelined approach minimizes the number of re-reads which improves the performance of the disk reading speed, especially in an error-prone environment.

SUMMARY OF THE INVENTION

The present invention pertains to a multi-level pipelined method of processing data errors in hard disk drives which minimizes disk re-reads. In the first level, a sector is read and a syndrome is generated based on the ECC bits appended for that sector. If there are no errors, the next sector is read. However, if an uncorrectable error is detected, a flag is checked. If the flag is currently set, the disk drive correction circuit is prevented from proceeding to the next sector which has errors. If the flag is not set, the disk drive is allowed to proceed with reading the next sector; the syndrome is stored in a register; and hardware error correction is performed. If the error is corrected by the hardware circuit, the process repeats by reading the next sector. But if the hardware circuit cannot correct the error, a third level firmware error correction is eventually initiated for handling the error. The flag is set in order to prevent a subsequent syndrome from overwriting the syndrome currently in the register. The flag is cleared only after the syndrome currently in the register has been read by the firmware. Once the flag is cleared, the disk drive may resume reading the next sector.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
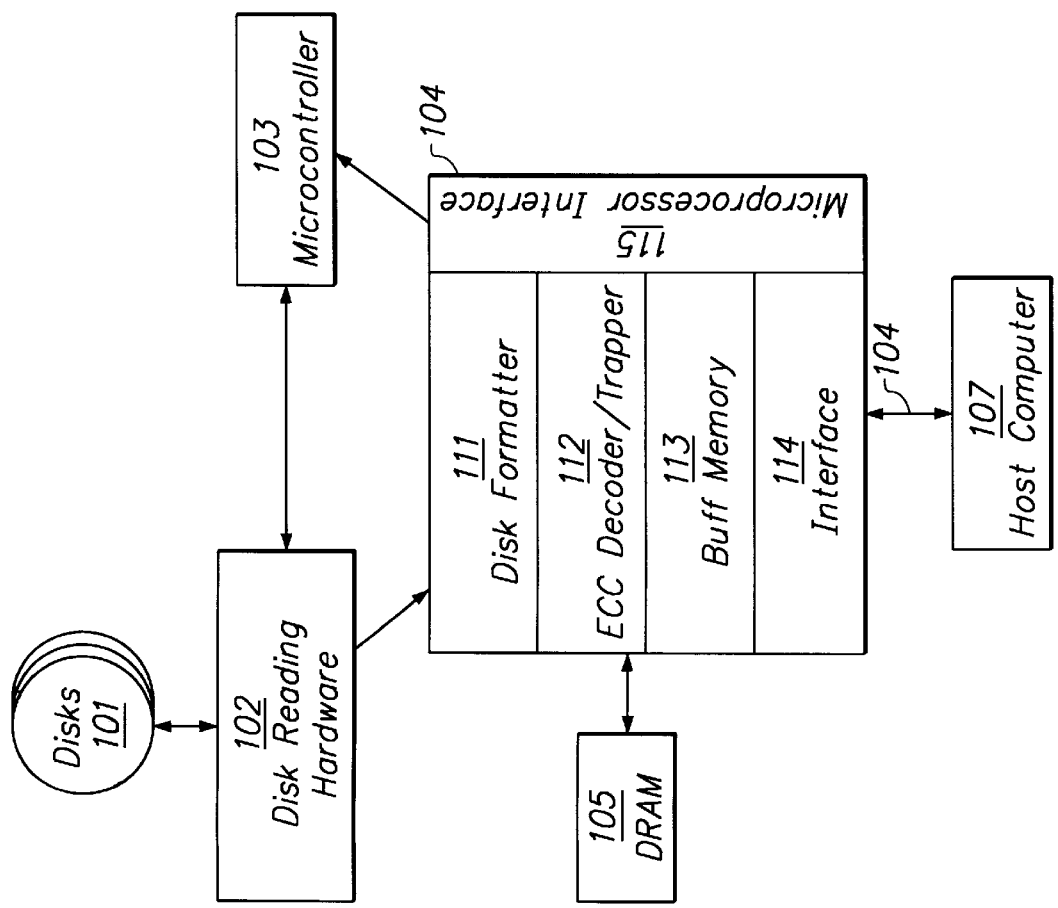
FIG. 1 shows a block diagram showing the components of a disk drive including error correction circuitry.

With reference now to FIG. 1, a block diagram showing the components of a disk drive is shown. The components of a disk drive include one or more disks 101 and head disk assembly (HDA) 102 which reads segments of data from disk 101 in response to control signals from microcontroller 103. The data from the disk is then transmitted to an application specific integrated circuit (ASIC) chip 104. ASIC chip 104 includes an interface 114 which interfaces with bus 106 for controlling the transfer of data between the ASIC 104 and the host computer 107. Microprocessor interface 115 provides an interface between microcontroller 103 and blocks disk formatter 111, ECC decoder/trapper 112, buffer memory 113, and bus interface 114 of ASIC 104. Disk Formatter 111 interfaces with the HDA 102 so as to control the writing of disk segments. Error correction code decoder/trapper circuit 112 performs the algorithms for generating ECC bits which are appended to each data segment being written to the disks 101. It also performs the function of trapping syndromes to determine whether any read data contains errors. The decoder/trapper circuit 112 also contains the hardware correction circuitry for correcting minor errors. The correct data is then transferred to the buffer manager residing in buffer memory 113. Eventually, the data is transferred to the dynamic random access memory (DRAM) 105.

Data segments are read by the disk reading hardware 102 from disks 101. The error correction codes are then separated from the data and a mathematical function is performed on the error correction codes so as to generate error syndromes. The data is transferred via the buffer memory 113 into dynamic random access memory 105. Disk data segments are continually read from disks 101. This process of transferring the data via buffer memory 113 into dynamic random access memory 105 continues sequentially and without interruption until all of the data requested by the sequencer is read or until error conditions are encountered.

As the error correction code is separated from the data and error syndromes are generated, the syndromes are transferred to the ECC decoder/trapper 112. In the ECC decoder/trapper 112, multiple mathematical calculations are performed on each non-zero error syndrome in an attempt to correct the error. Performing the mathematical calculations also determines the location of the error within the segment by calculating the error syndrome corresponding to the error. If the error syndrome cannot be used to correct the error, this error is deemed uncorrectable by the hardware correction circuit. Upon the detection of an error that is uncorrectable by the hardware of the disk drive, firmware proceeds to attempt to fix the error via an on-board microprocessor. If the firmware is successful, the corrected data is then transferred to the appropriate location in DRAM 105.

Figure 2:
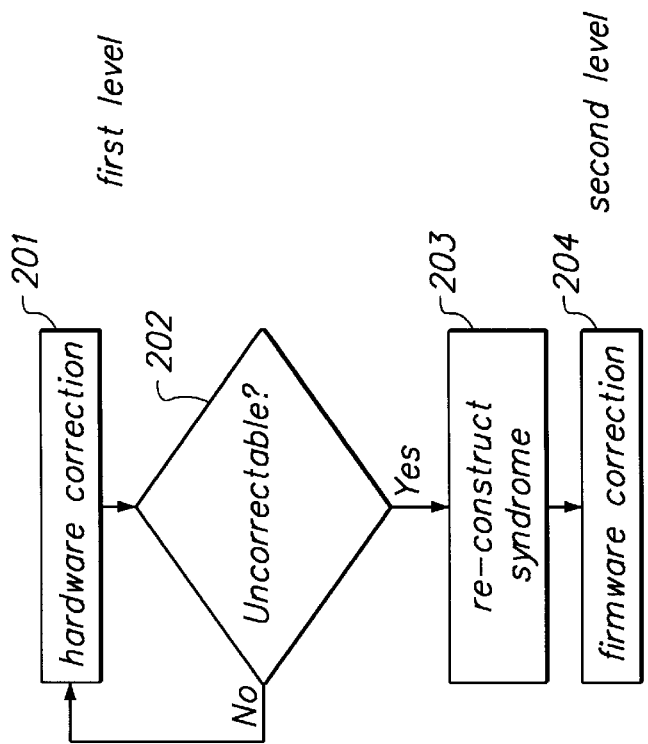
FIG. 2 is a flowchart describing the steps for performing a two-level error correction scheme.

FIG. 2 is a flowchart describing the steps for performing a two-level error correction scheme. In the first level, hardware correction is applied. Special, dedicated circuitry, performing mathematical calculations, is used to attempt to correct errors, step 201. If, however, the circuitry fails to correct the error, the error is deemed uncorrectable, step 202. In a currently preferred embodiment, the syndrome is reconstructed, step 203. In other embodiments, the syndrome may be recalculated from the start or the original syndrome may be retrieved from some temporary register. Thereupon, the firmware attempts to correct the error, step 204.

Figure 3:
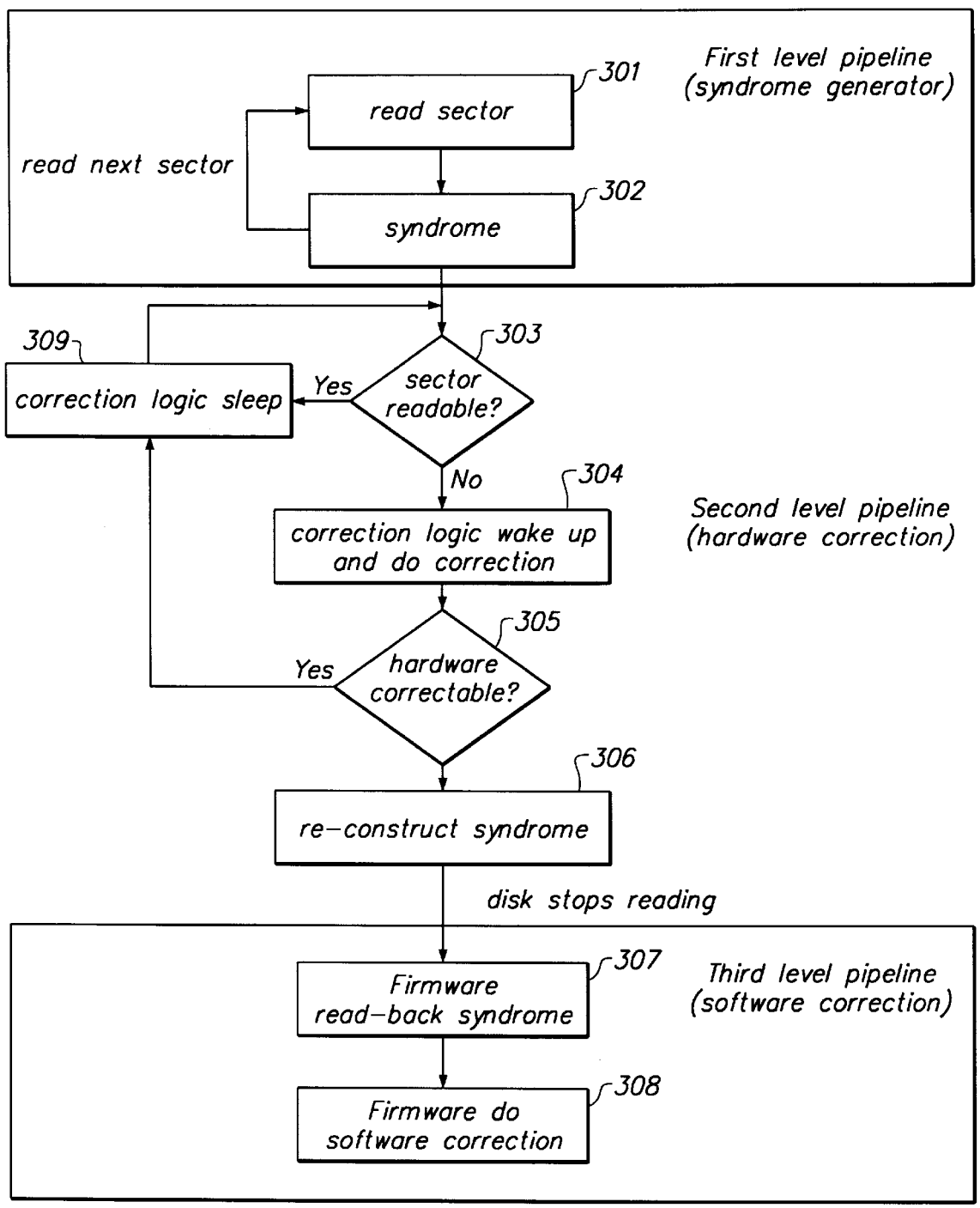
FIG. 3 is a flowchart describing in greater detail a three-level error correction scheme as practiced according to the present invention.

FIG. 3 is a flowchart describing in greater detail a three-level pipelined error correction scheme as practiced according to the present invention. Initially, a sector is read according to a read request received from the host computer system, step 301. Based on the ECC bits appended to that sector, the syndrome is generated, step 302. Because the present invention is practiced in a pipelined manner, next sectors can be continuously read while the method proceeds to the second level of the error correction scheme. Based on the syndrome generated, a determination can be made as to whether the sector is readable or unreadable, the latter meaning there is an error with that particular sector, step 303. If the sector is readable, no error is detected or the error is not to be checked for correction, the second level pipeline correction logic is entered into a sleep mode, step 309. Otherwise, if the sector is not readable and an error to be corrected is detected, the correction logic is woken up and hardware correction is performed, step 304. A determination is made in step 305 as to whether the hardware circuit can correct the error. If the error is corrected, the second level pipeline correction logic is entered into the sleep mode, step 309. Otherwise, the syndrome is reconstructed, step 306. It should be noted that when an "error trapper" scheme is used, the correction logic destroys the syndrome. Hence, the syndrome needs to be reconstructed. If the error persists, a third level pipeline of error correction is performed according to steps 307 and 308, and the disk idles. In step 307, firmware performs a read-back of the syndrome that was temporarily stored in a register. Thereupon, the firmware handles the error, step 308.

In order to minimize disk re-reads, the present invention utilizes a pipelined approach. Three separate "pipes" are used to process three error conditions. Thereby, the disk can continue to be read sequentially, provided that the error conditions do not exceed the capacity of these three pipes. In other embodiments, additional pipeline stages may be implemented to handle an even greater amount of error congestion.

Figure 4:
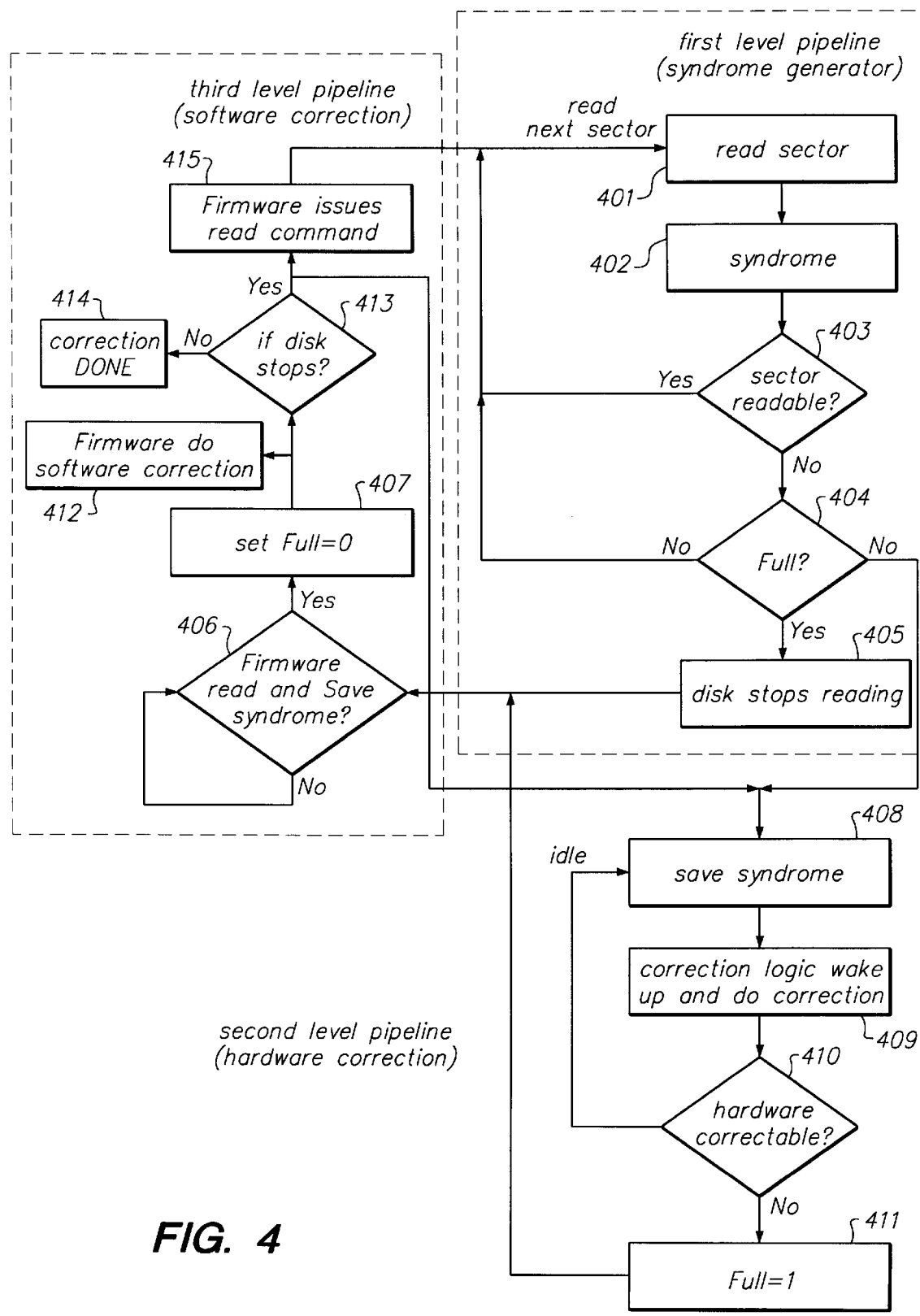
FIG. 4 shows a flowchart of the currently preferred embodiment of the three-level pipeline error correction scheme.

FIG. 4 is a flowchart showing another embodiment of the three-level pipeline error correction scheme according to principles of the present invention. Initially, a sector is read according to a read request generated by the host computer system, step 401. A syndrome is calculated based on the ECC bits corresponding to that sector, step 402. In step 403, a determination is made as to whether that sector is readable (i.e., whether there are any errors detected). If the disk is readable (there are no errors or the error is not to be corrected), reading of the disk is continued until either the read request is completed, or a "FULL" flag, indicating whether the drive can continue reading the disk, is set. When the FULL flag is set (FULL="1") reading is temporarily halted. If the sector contains an error and is not readable, it is also determined if the FULL flag is set, step 404. The FULL flag is used to indicate whether the disk drive can properly proceed to the second level of error correction. If the FULL flag happens to be currently set, then the disk drive temporarily stops reading off the disks, as indicated in step 405. The disk drive can resume reading off the disks only after the FULL flag has been cleared. How the FULL flag is cleared and what steps are followed after step 405 will be discussed below with reference to the third level of error correction. Returning back to step 404, if the FULL flag is not currently set, two are allowed to occur. In a first action, the disk drive can now proceed to read the next sector (if any) by repeating step 401. Note that with pipelined implementation of the present invention, the disk drive has the capability of continuing to read sectors, even while attempting to correct a previously encountered error. In the second action, the second level error correction (e.g., steps 408–411) is initiated.

In the second level of error correction, the syndrome corresponding to the bad sector (calculated in step 402) is stored in a register, step 408. In the next step 409, the second level pipeline correction logic is woken up and hardware error correction is used in attempting to correct the error that was detected in step 403. A determination is made in step 410 as to whether the error is correctable by the hardware circuit. If the error is corrected by the hardware, the second level error correction returns to an idle, or sleep, state. However, if the error is not correctable by the hardware circuit, the FULL flag is set (e.g., FULL=1). One way to determine whether the error is hardware correctable is to implement a time-out scheme. If the error persists after a certain time has elapsed, the error is deemed uncorrectable by the hardware. Setting the FULL flag indicates that the syndrome register is already loaded with a syndrome that has yet to be read and processed by the third level firmware error correction scheme. Hence, if a subsequent error is encountered while the FULL flag is set, the disk drive temporarily halts. The system cannot store the syndrome in the register because this would cause the previously stored syndrome to be overwritten and lost. However, note that even with the FULL flag set, the disk drive can continue to read sectors up until another error occurs. This feature of the present invention allows fast read operations to be performed in a high error environment.

The FULL flag remains set until the firmware error correction scheme, performed by the microprocessor, reads the previously saved syndrome. It may take time before the microprocessor directs its attention to handling the error because the microprocessor is responsible for processing a multitude of different tasks. Besides handling errors, the microprocessor performs a wide range of other functions. Thus, the third level of error correction must wait for the microprocessor to next become available. Additionally, as shown in the flowchart of FIG. 4, the third level of error correction can be entered via the second level (hardware correction) or the first level (syndrome generation). When the microprocessor eventually is assigned to handle the error, it reads the syndrome from the register. In step 406, a determination is made as to whether the microprocessor firmware has read and saved the syndrome for its software correction. If the firmware has not read the saved syndrome, the system remains in the wait state and continues to check for the syndrome to be read and saved. If the firmware has read the saved syndrome, the syndrome register is available. Consequently, the FULL flag is cleared, step 407. Next, two actions are performed in parallel. First, the firmware performs the software correction on the read syndrome, step 412. Second, a determination is made as to how the third pipeline level had been entered. As seen from the flowchart of FIG. 4, the third level pipeline can be entered from the first level after the disk drive is temporarily halted from reading (step 405), or from the second level after the it is determined that the hardware correction was not successful and the FULL flag is set (steps 410, 411). To determine how the third level was entered, a determination is made as to whether the disk drive had been halted from reading, step 413. If it is determined that the disk drive had not been halted, then the error correction scheme is done, step 414. However, if the disk drive had been halted, then two paths are followed. In one path, firmware issues a read command, step 415, and a next sector (if any) of the read request is read, step 401, and the entire error correction scheme is carried out for this sector. In the alternative path, the second pipeline level is entered at step 408 to carry out the hardware correction.

It is important to reiterate that the present invention allows the hard disk drive to continue reading sectors, even in the presence of previous errors. The hard disk drive continually reads sectors until the FULL flag is set and the firmware has yet to read the saved syndrome. Consequently, this three pipelined scheme allows the disk drive to perform fast reads in an error prone environment.

In short, the present invention saves the re-operating time on the sector posterior to the error sector(s). Initially, the disk drive halts its reading process due to the first uncorrectable error to be fixed or removed. When the coding process resumes, instead of re-encoding the next sector all over again, the present invention adopts the advantages of a pipeline scheme to provide the ability of storing the prior reading processes of the next sector. Hence, when the error is detected and fixed in the error finding block and another error is detected in the decoding block, the first savor of the decoder block stores all the prior operating process of the next sector. In comparison, the uncorrectable errors amending process associated with the prior art typically involve repeatedly re-reading bad sectors and processing them from the start each time. Also, the prior art usually quits functioning as the second error is detected. In other words, after the first error is fixed, the coding system has to re-read the second error. Then, the processing is started all over again from the beginning in order to supply the information to the error finding block. In contrast, the present invention provides the advantage of saving the process that was already performed on the next sector. This eliminates the need for re-reading that sector and starting all over again. This pipeline concept applies on two levels of syndromes. When the first error is undergoing the error finding process, the second error is waiting in the decoding block. As the first error is removed, the second error is fed into the error finder block without having to be re-read from the beginning again.

Figure 5:
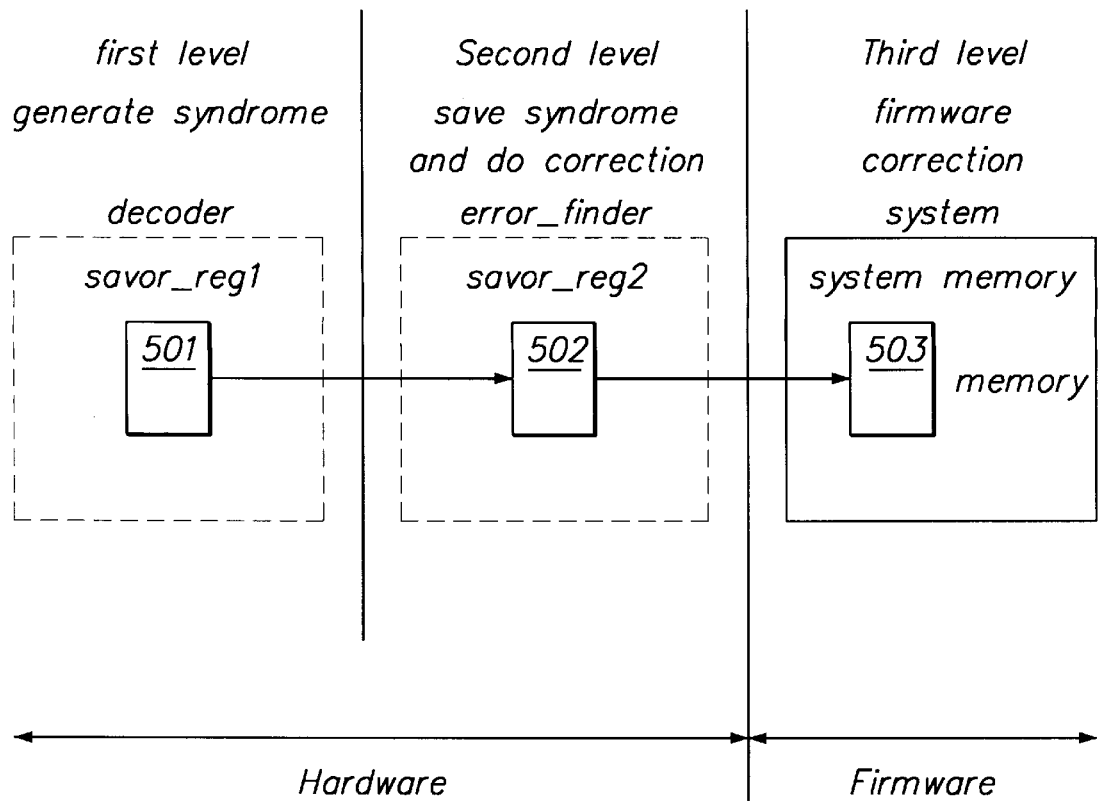
FIG. 5 shows a block diagram of the decoder and error-finder.

FIG. 5 shows a block diagram of the decoder and error-finder. The savor_reg1 501 generates syndromes and detects errors. The savor_reg2 502 saves the syndromes which pass from the savor_reg1 and corrects errors. As the uncorrectable error happens or the correctable error cannot be amended in time, at the same time when the second error is detected, the disk reading stops.

Figure 6:
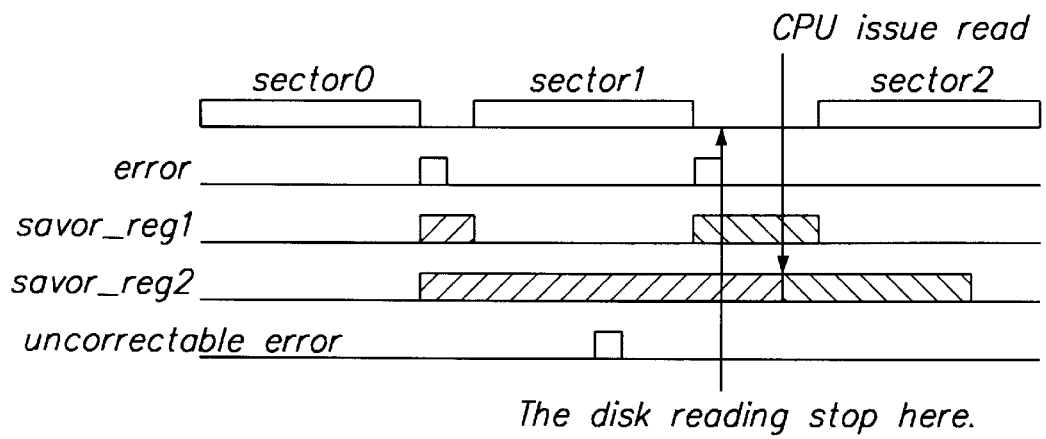
FIG. 6 shows an exemplary timing diagram for practicing the present invention.

An example is now offered with respect to the timing diagram of FIG. 6. The disk reading stops after a second error is detected. The savor_reg1 stores the syndrome of sector1. The savor_reg2 saves the syndrome of sector0. After the CPU has rectified the error in the savor_reg2, it instructs the savor_reg1 to roll over so that the error-finder can perform its correction. Simultaneously, it can also issues the coding system to begin disk reading on the next sector (e.g., sector2). Hence, there are two advantages offer by the present invention. The first advantage is to shorten the sector rereading time. When the first uncorrectable error is handled, the second error rolls over to the error finder without having to be re-read from the beginning. The second advantage is to reduce the error correcting time. When the second error is transported into the error finding block, instead of the correcting process being performed by the CPU, the correction is performed by the error finder. Thereby, this saves the time for reads.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of processing errors in data read from a disk of a disk drive system, comprising the steps of:

reading data and error correction code bits from a first sector of the disk;

generating a first error syndrome value based on the data and error correction code bits that were read from the first sector;

processing the first error syndrome value to determine whether the data contains an error, wherein if an error is detected, a hardware correction circuit attempts to correct the error;

determining whether the error is correctable by the hardware correction circuit, and if so correcting the error with the hardware correction circuit and reading a second sector of the disk; and if the error is deemed uncorrectable by the hardware correction circuit:
   storing the first error syndrome in a memory;
   setting a flag to indicate that the first error syndrome is stored in the memory;
   performing error correction under firmware control;
   clearing the flag after the firmware reads the first error syndrome stored in the memory; and
   determining whether to continue reading sectors from the disk based at least in part on whether the flag is set.

2. The method of claim 1 further comprising the steps of:
   reading the second sector while the error in the first sector is being processed;
   determining whether the second sector has an error, wherein if the second sector has an error;
   temporarily stopping reading sectors from the disk if the flag is set;
   continuing to read sectors from the disk if the flag is not set.

3. The method of claim 2 further comprising the steps of:
   waiting until the firmware reads the first error syndrome to clear the flag;
   continuing to read subsequent sectors after the flag is cleared.

4. The method of claim 3 further comprising the step of reconstructing the first error syndrome.

5. The method of claim 3 further comprising the step of recalculating the first error syndrome.

6. In a disk drive, an apparatus for processing data errors, comprising:

a disk for storing data in sectors, each sector having ECC bits for safeguarding the data;

a decoder coupled to the disk for generating a syndrome based on the data and the ECC bits read from the disk, wherein an error is detected based on the generated syndrome;

a memory coupled to the decoder for storing the syndrome, wherein a flag is set when the syndrome is initially stored in the memory;

an error corrector coupled to the memory for correcting errors that have been detected, wherein the error corrector reads the syndrome stored in the memory and attempts to correct the error based on the syndrome while subsequent sectors are being read by the disk drive.

7. The apparatus of claim 6 further comprising a flag mechanism, wherein the flag is set if a second error is detected before the error corrector has read a syndrome corresponding to a first sector to indicate that the disk drive stop reading the disk.

8. The apparatus of claim 7, wherein the flag is cleared once the error corrector has read the syndrome corresponding to the first sector so that a syndrome corresponding to a second sector can be stored into the memory and the disk drive can resume reading the disk.

9. The apparatus of claim 8, wherein the decoder regenerates the syndrome corresponding to the second sector.

10. The apparatus of claim 7 further comprising a reconstruction circuit coupled to the error corrector for reconstructing the syndrome.

11. In a disk drive, a two-level pipelined method of processing data errors for minimizing disk re-reads, comprising the steps of:

reading a first sector;

determining whether the first sector contains an error, wherein if there are no errors detected, the disk drive reads a next sector;

if there is an error detected:
    stopping the disk drive from reading the next sector if a flag is set to a first state, otherwise allowing the disk drive to read the next sector;
    storing a syndrome corresponding to the first error in a register;
    setting the flag to the first state when the syndrome is stored into the register;
    waiting, for the syndrome to be read from the register;
    clearing the flag when the syndrome is eventually read from the register.

12. The method of claim 11 further comprising the steps of:
    correcting the error on a first level by utilizing a hardware circuit;
    resolving the error on a second level by utilizing a processor under firmware control.

13. The method of claim 12, wherein the flag is set only if the error is deemed uncorrectable by the hardware circuit.

14. The method of claim 13 further comprising the step of reconstructing the syndrome.

15. The method of claim 13 further comprising the step of recalculating the syndrome.

* * * * *